(12) United States Patent
Bohannon (10) Patent No.: US 11,675,858 B2
(45) Date of Patent: Jun. 13, 2023

(54) ENHANCED CONTENT FORMAT MANAGEMENT FOR WEB SERVICES

(71) Applicant: Primer Technologies, Inc., San Francisco, CA (US)

(72) Inventor: John Bohannon, San Francisco, CA (US)

(73) Assignee: Primer Technologies, Inc., San Francisco, CA (US)

( * ) Notice: Subject to any disclaimer, the term of this patent is extended or adjusted under 35 U.S.C. 154(b) by 0 days.

(21) Appl. No.: 16/913,750

(22) Filed: Jun. 26, 2020

(65) Prior Publication Data

US 2020/0410021 A1 Dec. 31, 2020

Related U.S. Application Data

(60) Provisional application No. 62/867,085, filed on Jun. 26, 2019.

(51) Int. Cl.
*G06F 16/00* (2019.01)
*G06F 16/9535* (2019.01)
(Continued)

(52) U.S. Cl.
CPC ........ *G06F 16/9535* (2019.01); *G06F 16/908* (2019.01); *G06F 16/9035* (2019.01); *G06F 16/9038* (2019.01); *G06F 16/9536* (2019.01)

(58) Field of Classification Search
CPC ............. G06F 21/10; G06F 2221/0737; G06F 2221/2101; G06F 21/86; G06F 16/7844; G06F 21/74; G06F 2221/2105; G06F 21/105; G06F 16/90335; G06F 16/783; G06F 16/904; G06F 30/20; G06F 2221/2135; G06F 2221/2137; G06F 2221/2151; G06F 2221/0797; G06F 21/71; G06F 2221/2149; G06F 2211/007; G06F 2221/2115; G06F 21/572; G06F 21/725; G06F 21/73; G06F 21/42; G06F 21/51; G06F 21/57; G06F 21/608; G06F 21/78; G06F 21/87; G06F 2221/034; G06F 2221/0775; G06F 2221/0782; G06F 2221/2141; G06F 2221/2143; G06F 2221/2147; G06F 21/31; G06F 21/33; G06F 21/6209; G06F 21/6245; G06F 2221/2117; G06F 12/1408; G06F 16/901; G06F 21/64; H04L 63/20; H04L 2463/102; H04L 2463/101
See application file for complete search history.

(56) References Cited

U.S. PATENT DOCUMENTS

10,321,167 B1 * 6/2019 Edell .................. H04N 21/2743
10,592,525 B1 * 3/2020 Khante ................ G06F 16/258
(Continued)

*Primary Examiner* — Shyue Jiunn Hwa (57) ABSTRACT

Systems, methods, and software described herein provide improvements for providing content to end users in a computing network. In one example, a content service may determine and provide first content items in first content formats to end users. After providing the first content items, the content service may monitor user interactions for the end users with one or more services and determine content formats of interest for the end users based on the user interactions. The content service may further determine second content items to be provided to the end users based on the content formats of interest.

20 Claims, 7 Drawing Sheets

(51) Int. Cl.
    *G06F 16/9035*     (2019.01)
    *G06F 16/908*     (2019.01)
    *G06F 16/9536*     (2019.01)
    *G06F 16/9038*     (2019.01)

(56) References Cited

U.S. PATENT DOCUMENTS

| | | | | |
|---|---|---|---|---|
| 2012/0079606 | A1* | 3/2012 | Evans | G06Q 30/04 |
| | | | | 726/28 |
| 2015/0293988 | A1* | 10/2015 | Eubanks | G06F 16/285 |
| | | | | 707/738 |
| 2018/0005293 | A1* | 1/2018 | Adams | G06F 16/90335 |
| 2019/0236203 | A1* | 8/2019 | De Boer | G06F 16/3328 |
| 2021/0049647 | A1* | 2/2021 | Mathieu | G06Q 30/0271 |

* cited by examiner

ENHANCED CONTENT FORMAT MANAGEMENT FOR WEB SERVICES

RELATED APPLICATIONS

This application hereby claims the benefit of and priority to U.S. Provisional Patent Application No. 62/867,085, titled "ENHANCED CONTENT FORMAT MANAGEMENT FOR WEB SERVICES," filed Jun. 26, 2019, and which is hereby incorporated by reference in its entirety.

BACKGROUND

Content sources, such as news providers, advertising corporations, media corporations, or other similar content providers are required to generate content that can be provided to end users at end user devices. The content provided to the end users may include images, text, audio files, video files, graphs, or some other similar type of content that can be provided via a display interface, audio interface, or some other user interface on the end user device.

In providing the content to the end users, content providers often have a difficult determination of what content is relevant and should be provided to each of the end users. As an example, while a first user may prefer and respond to a first type of content, another user may prefer and respond to a different type of content. Additionally, content sources may desire feedback on how various content items are being perceived by the end users, permitting the content sources to modify their content to better suit the preferences of the various end users. However, while it is desirable to obtain feedback to current content to update future content, current processes for maintaining and using the feedback can be cumbersome and difficult for the content providers.

OVERVIEW

Provided herein are enhancements for optimizing content to be provided to end users. In one implementation, a method of operating a content service includes determining first content items in first content formats for at least one end user and monitoring user interactions for the at least one end user with one or more services. The method further includes determining content formats of interest for the at least one end user based on the user interactions and determining second content items in second content formats for the at least one end user based on the content formats of interest.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
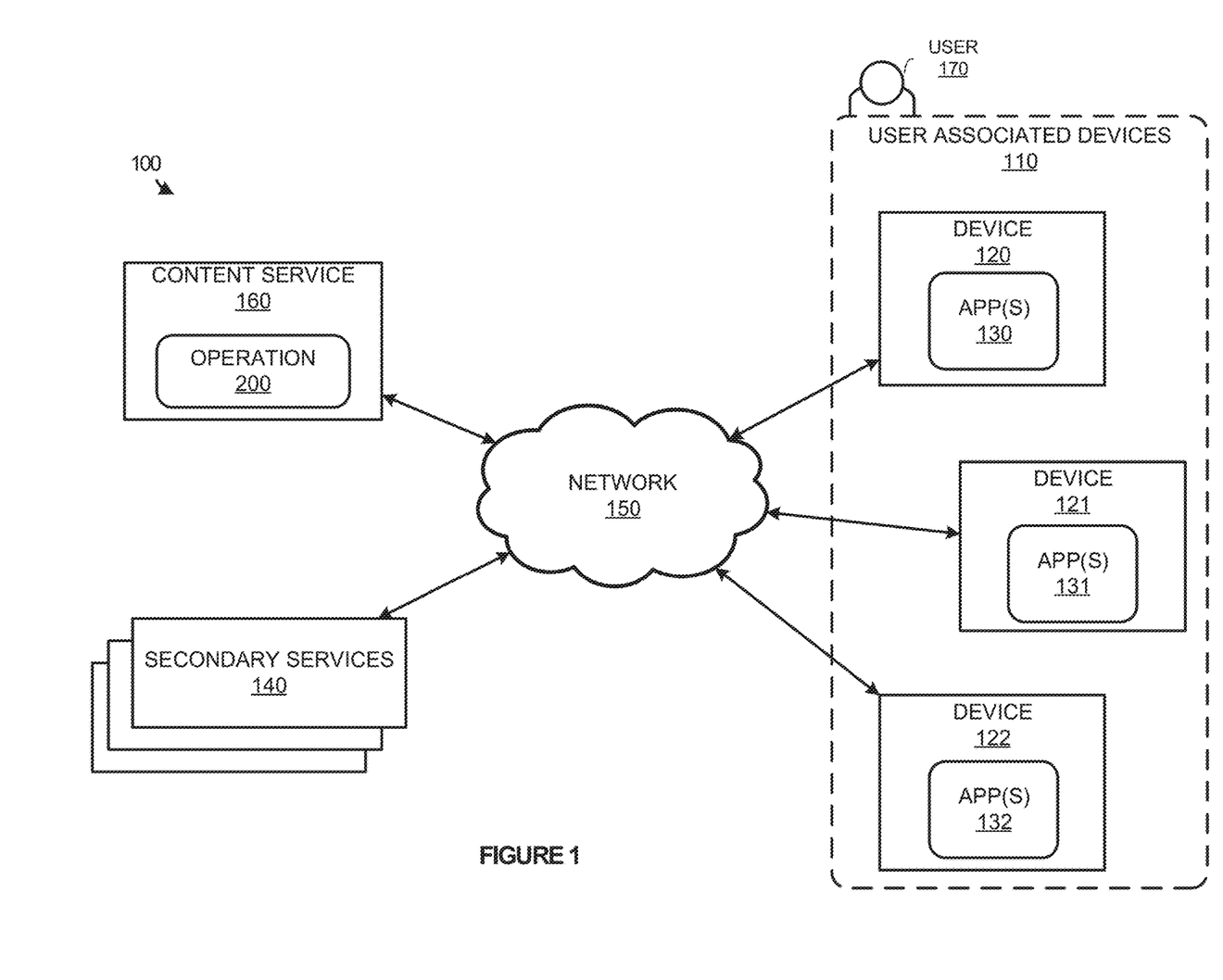
FIG. 1 illustrates a system to distribute content to an end user according to an implementation.

FIG. 1 illustrates a system 100 to distribute content to an end user according to an implementation. System 100 includes secondary services 140, content service 160, and devices 120-122 that correspond to user associated devices 110 of user 170. Secondary services 140, content service 160, and devices 120-122 may communicate via network 150. Devices 120-122 may comprise desktop computers, laptop computers, smartphones, tablets, or some other similar computing device capable of receiving data from content service 160. Devices 120-122 include applications 130-132 that correspond to applications capable displaying, providing audio, or providing some other similar user interface for providing the content from content service 160. Content service 160 is configured to provide operation 200 that is further described below in FIG. 2.

In operation, content service 160 determines content items to be distributed to end devices, such as devices 120-122. This content may comprise text, images, video files, audio files, graphs, or some other similar content item format, including combinations thereof. This content may be provided as part of a social media platform, as part of a media platform (e.g., streaming service), as part of a news service, or any other similar platform or service. In some implementations, secondary services 140 may comprise news websites, social media platforms, search engines, or some other similar services, wherein content service 160 may supply content items to be provided as part of the service. For example, a secondary service may comprise a social media platform, and content service 160 may determine advertisements with text, images, video, and the like to be provided as part of the secondary service. In determining the content to be provided to the end user, content service 160 may monitor user interactions with services that correspond to applications 130-132 to determine feedback regarding previous content that was provided to user 170. As an example, first content items may be provided to user 170, where the content items may be provided in various content formats and correspond to a first topic, such as a vacation advertisement, a web service advertisement, a product advertisement, a political post, a news topic (sports, business, and the like), or some other similar topic. For each of the content formats, the content formats may have specific traits, including the type(s) of the content or media included in each content object (image, text, video, graph, or some other type of content, including combinations thereof), the structure or arrangement of the content (where text, images, videos, and the like are located are located in the content item), or some other similar formatting information for the content.

After providing the first content items to user 170, content service 160 may monitor user interactions using applications 130-132. In monitoring the user interactions, content service 160 may determine when user 170 shares any of the first content, uses language or data from any of the first content, shares any images or other media associated with the first content, or provides any other similar interaction associated with the first content. When a user interaction is identified that corresponds to the first content, content service 160 may use the interaction to determine formats of interest for user 170. As a result, although each of the content items in the first content may provide similar information to user 170, content service 160 may use the user interactions associated with the first content to determine formats of interest for user 170. As an example, if information related to a first topic were provided to user 170 in a text-based content item, an image-based content item, and a video-based content item. Content service 160 may monitor user interactions across applications 130-132 and the associated services to determine which of the formats were most relevant to user 170. Thus, if the user frequently used language similar to that of the text-based item, then content service 160 may identify that text-based format content items should be supplied to user 170 in the future. Similarly, if user 170 used language from the video-based item, then content service 160 may identify video-based formats are most relevant to the user. Once an interaction is identified that is associated with the first provided content, content service 160 may determine that future content items should be provided that favor the format corresponding to the interaction.

Additional information may also be gathered through the use of content service 160, including social media platforms that are most relevant to the user, the time of day that content is most relevant to the end user, the context of the content items that are relevant to end users (e.g., social media posts in proximity to the content item post), or some other similar information from monitoring services provided by applications 130-132. From the information, content service 160 may identify relevant presentation information and formatting for future content.

In some implementations, content service 160 may generate the content items using various text, images, video, and other media related to a particular topic. For example, content service 160 may assemble or arrange the media to create the required content object in accordance with the various content formats. In other implementations, a content creator may generate multiple content items in accordance with various content formats and related to a particular topic. For example, the content creator may provide multiple content items that correspond to a political campaign and provide data points (facts, opinions, or other information) related to the campaign.

Figure 2:
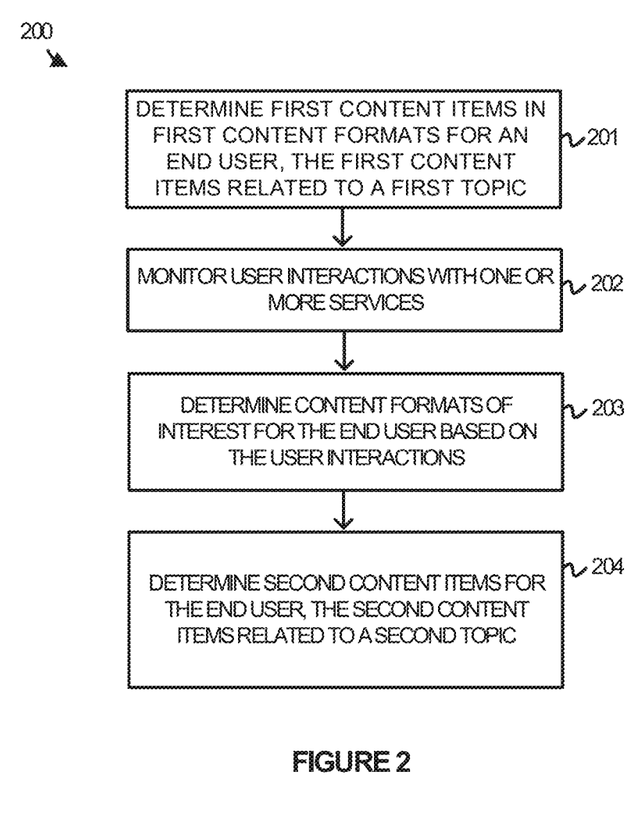
FIG. 2 illustrates an operation of a content service to distribute content to an end user according to an implementation.

FIG. 2 illustrates an operation 200 of a content service to distribute content to an end user according to an implementation. The processes of operation 200 are referenced parenthetically in the paragraphs that follow with reference to elements of system 100 of FIG. 1.

As depicted, operation 200 includes determining (201) first content items in first content formats for at least one end user, the first content items related to a first topic. These content items may comprise product advertisements, news stories, or some other similar content item. The content items may be provided in various content formats including images, text, videos, graphs, or some other similar content format, including combinations thereof. The content items may be delivered for display to user 170 using a variety of different services and applications, where the services and applications may comprise social media service applications, blogs, news websites, or some other similar service or application. For example, a content item may be provided as an advertisement for a social media service for user 170. In some implementations, first content items 170 may be provided directly from content service 160, however, in other implementations, the content may be provided to a content provider, such as a news service, a search engine, a social media service, or some other similar web service.

Once provided to the web service, the web service may provide the content item as part of other content on one of devices 120-122.

Once the first content is determined for the at least one end user, operation 200 on content service 160 further monitors (202) user interactions with one or more services and determines (203) content formats of interest for end user 170 based on the user interactions. In some implementations, each of the first content items that are provided to an end user may include attributes that can be used to distinguish a first content item from a second content item. For example, a first content item in a first format may include a first image and first text, while a second content item in a second format may include a video with second text. Once the first content items are provided to user 170, content service 160 may monitor services associated with applications 130-132 in user associated device 110 to determine formats of interest for user 170. In some implementations, applications 130-132 may comprise social media applications, message boards, blogs, messaging applications, or some other similar application. Content service 170 may monitor posts, messages, or other interactions from user 170 to identify formats of interest. This may include the word choice of user 170 in the user interaction, the images used by the user in the user interactions, or some other similar information related to the interaction.

As an example, user 170 may be provided, in a first social media service, a first content item, where the content item includes a text portion that describes attributes or facts for a particular topic. Once the first content item is provided to user 170, content service 160 may monitor the interactions of user 170 to identify the use of at least a portion of the text of the content item in the same service or across one or more other services. As a result, when user 170 uses a portion of the text from the first content item, content service may identify the format of the first content item as a format of interest. In some implementations, in identifying the formats of interest, content service 160 may compare the usage of information from the various formats related to the content. As an example, when the content is provided to the user, the content may include different language and/or facts related to the particular topic. Once the content items are provided, content service 160 may determine when user 170 uses the various language and facts provided in the content and may determine the format that corresponds to the language and/or fact from the user. Additionally, content service 160 may identify the use of images, video, or some other similar types of content by user 170. For example, if the user 170 reposted a video from a content item, then content service 160 may identify that the format of the content item is of interest to user 170.

In some implementations, in determining content formats of interest, content service 160 may maintain one or more data structures that identify user interactions that correspond to content items that are provided to the end user. These data structures may identify the frequency that a user generates an interaction corresponding to a particular format, the frequency of user interactions related to various topics, the frequency of user interactions from content items posted to each social media platform, news platform, or other similar digital platform, or some other similar information. From the data structure, content service 160 may identify the content formats that are most relevant to the end user, including the content formats and platform for the content.

In at least one implementation, the content items in the first format may provide the same information or attributes related to a particular topic. In particular, content items related to an advertisement may provide the name of the product, the use of the product, and a review of the product. These content items may be provided in various formats that each include the same information, but include different images, different video, different text structure (e.g., word choice, organization, and the like), or other synonymous mutations of the same information. As a result, when end user 170 provides an interaction using one of applications 130-132, content service 160 may distinguish between the various content formats based on the differences in the way the data was presented. Thus, if two content items provided the same information using synonymous mutations of language, then content service 160 may determine which content format was of interest for the user based on the language provided by the user in the interaction.

While the content formats of interest are identified, content service 160 may determine (204) second content items for the end user, wherein the second content items may be provided in a format consistent with the formats of interest for end user 170. Returning to the example of a first content item in a first format that includes a first image and first text, and a second content item in a second format that includes a video with second text, content service 160 may monitor applications 130-132 to determine whether any user interactions with the application include data that was provided in the first content item or the second content item. In doing so, content service 160 may identify text from user 170 and determine similarities between the text and the previously presented content items. In particular, content service may monitor the types of text that are generated by the user, the information in the posts generated by the user, the types of images or other media that are shared by the user, or some other information. Based on the information, content service may determine content formats of interest for the user and determine second content items for the end user.

As an illustrative example, content service 160 may generate first content items in first content format related to political campaigns. After generating the first content items and providing the content items to user 170 using applications 130-132, content service 160 may monitor interactions of user 170 with applications 130-132 to determine content formats of interest to user 170. These content formats of interest may include the organization or arrangement of the media in the content item, the length of the media in the content item, or some other similar information about the content formats. Once the content formats of interest are identified, content service 160 may determine content items for user 170 based on the content formats of interest. Thus, when additional content items are provided to the user and are related to the same topic, the content items may be provided in format consistent with the interests of user 170.

In at least one example, content service 160 may maintain one or more data structures that contain profiles associated with various end users. These data structures may be updated to reflect content formats of interest for each of the users, wherein the various formats may be allocated scores, ratios, or other similar values that indicate how often each of the formats should be provided to an end user. As a result, when interactions are identified that are related to previous content provided to a user, content service 160 may update the one or more data structures to reflect the preferences of the corresponding user.

Figure 3:
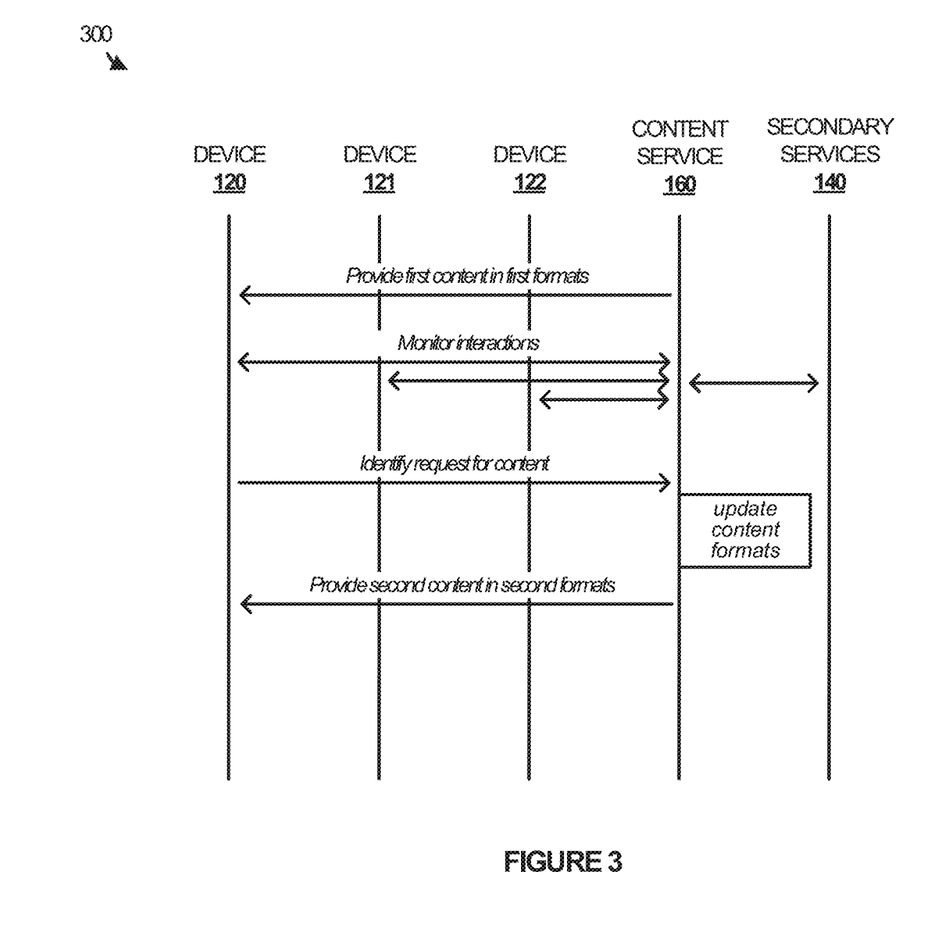
FIG. 3 illustrates a timing diagram of improved content distribution according to an implementation.

FIG. 3 illustrates a timing diagram 300 of improved content distribution according to an implementation. Timing diagram 300 includes systems and elements of system 100 of FIG. 1. In particular, timing diagram 00 includes devices 120-122, content service 160, and secondary service(s) 140.

As depicted, content service 160 provides, for display, first content items in first formats to device 120, wherein the content items may each comprise an arrangement of text, images, videos, or some other similar media including combinations thereof. In some implementations, content service 160 may represent its own service, such as a social media service, news service, or some other similar service, however, content service 160 may be used to provide content to other services, such as advertisements on news and social media services. After the first content items are provided to device 120, content service 160 may monitor interactions of the user associated with device 120 to determine content formats of interest to the user. In particular, content service 160 may monitor user interactions across devices of the end user by monitoring the user's interaction with content service 160 and/or secondary services 140. In some implementations, content service 160 may monitor the user interactions across multiple services, including secondary services 140, wherein secondary services 140 may comprise news services, social media services, blog services, or some other service. This monitoring may include monitoring language use, image use, video shares, or some other similar user interactions. The interactions may be directly with content service 160 or may be with other secondary services 140. As an example, content service 160 may provide first content in first formats and monitor interactions by the user with one or more social media services to determine if the interactions include information from a particular format.

In some examples, in providing the first content in the various formats, content service 160 may provide the same information or data points (facts, opinions, quotes, statistics, and the like) using a variety of different formats. For example, a first content item may display a data point as an image, while a second content item may provide the data point in a sentence or other text-based element. Once provided, content service 160 may monitor the interactions by the user to determine if the user generates an interaction that includes the data point, and whether the data point is shared in association with a particular format. In particular, if the data point is shared as the image, then content service 160 may determine that the first format is of interest to the user.

As the interactions are monitored, content service 160 may identify another request for content by the end user. This second request may come after a threshold period, may come after designated quantity of interactions, or may come and any other interval for providing the first content. Once the request is obtained, content service 160 may update content formats for the user based on the monitored interactions and provide second content in second formats that correspond to the updated content formats. In some implementations, in monitoring the interactions, content service 160 may maintain one or more data structures that indicate formats of interest based on interactions associated with the user. For example, if, for a first topic, the same data points or information were provided in three different formats, content service 160 may monitor trends in the use of language, images, videos, or other information from each of the various formats in the other interactions of the user. The trends may be based on the quantity of times that language related to a format is used, the quantity of images shared from the various formats, the quantity of times that the format is shared (e.g. a link is shared to another social media platform), or some other trend related statistic. From the trends, content service 160 may determine formats of interest for the user. Thus, if information is frequently shared that is related to a first format, but information is not frequently shared that is related to a second format, content service 160 may determine that the first format is more relevant to the end user. Consequently, when a request is generated for new content, content service 160 may determine that content items of the first format should be provided to the end user.

Figure 4:
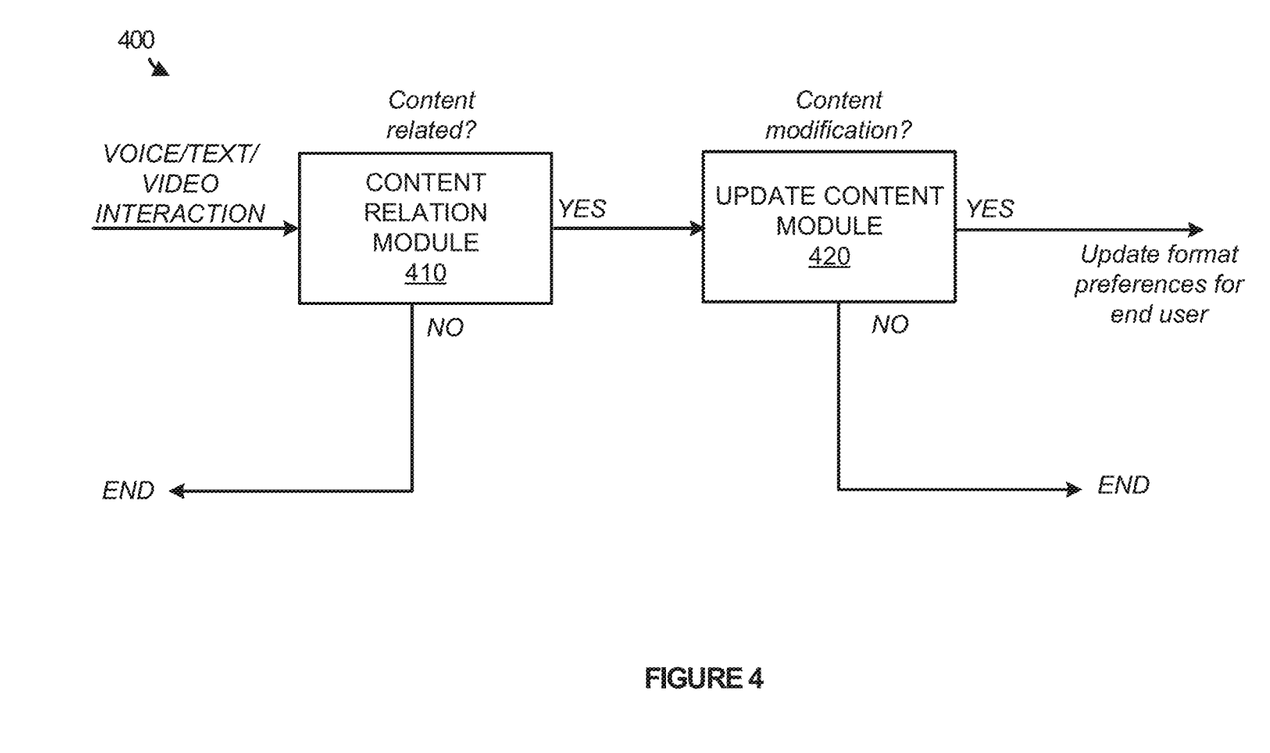
FIG. 4 illustrates an operational scenario of processing user input to update content distribution according to an implementation.

FIG. 4 illustrates an operational scenario 400 of processing user input to update content distribution according to an implementation. Operational scenario 400 includes language understanding module 410 and update content module 420, which may be implemented in a content service, such as content service 160 of FIG. 1.

In operation, language understanding module 410 obtains an interaction from a user, wherein the interaction may comprise voice data, text data, video data, image data, or some other similar content from a user. The interaction may be identified from a service, such as a social media service, a news service, a search engine, or some other similar service. As an example, a user may generate a post in a social media service that can then be identified by language understanding module 410 at the content service. Once identified, language understanding module 410 will determine whether the interaction is related to content of from a first set of content items provided to the end user. These content items may comprise text, videos, images, or some other similar content related to a particular topic. For example, a topic may correspond to a political election and content items related to the election may be provided in a variety of different formats, wherein each of the formats may comprise different images, text, videos, and the like, including combinations thereof. As the content items are distributed to the user, user interactions from the user with one or more services may be monitored to determine the formats of interest to the user. In determining whether the interaction was related to the content items, language understanding module 410 may use natural language processing, identify data points that are included in the interaction, identify images or videos from the first content items, or provide some other similar operation to determine whether the interaction corresponds to the first content items. Returning to the political election example, language understanding module 410 may determine when the interaction includes data points from the first content items, includes a language pattern that is similar to one or more content formats, includes an image or video from the content items, or includes some other information related to the content items. If the content of the interaction is not related to the content items that were previously provided to the user, then operational scenario 400 is ended. Otherwise, if the content of the interaction is related to the first content items that were provided to the user, operational scenario 400 moves to update content module 420.

In some examples, in implementing content relation module 410, content relation module 410 may include criteria to determine whether an interaction is related to previously provided content. The criteria may comprise text structure criteria, image similarity criteria, data point usage criteria, or some other similar criteria. For example, when a user interaction is identified that corresponds to a post to a social media network, the language content of the post may be compared to text structures of previously provided content items. If at least a portion of the post satisfies structure criteria for a previously provided content item (e.g., same data points, word choice, and text organization), content relation module 410 may determine that the post is related to the previously provided content item. Although this is one example, it should be understood that content relation module may further compare images, videos, or some other content from the interaction to the previously provided content items to determine if the interaction related to the first content items.

Once it is determined that the interaction is related to the first content, update content module 420 may determine whether the content preferences should be updated for the user. In particular, when the first content items are provided to the user, the content item may be provided in various different formats. Based on the use of content from the content items, update content module 420 may determine what content formats should be provided to the user for future content items. In some implementations, the update may be determined based on the frequency that content is used from each of the formats, based on the type of information that is shared from each of the formats, or based on some other factor related to the trends from the user. As an example, if the user was provided with content items in three different formats, but the user used content related to a first formats of the three formats five times more frequently than the other formats, update content module 420 may modify the profile for the user, such that future content items are more frequently provided in the first format.

In at least one implementation, the profile for the user may be associated with various topic types, wherein the topic types may comprise advertisements, political posts, news summaries or some other similar topic type. As a result, the content service may monitor the user interactions with each of the topic types to determine formats of interest associated for the topic types. Using this configuration, a content service may identify that a first format is most relevant for advertisements, while identifying that a second format is most relevant for news articles of the end user.

Figure 5:
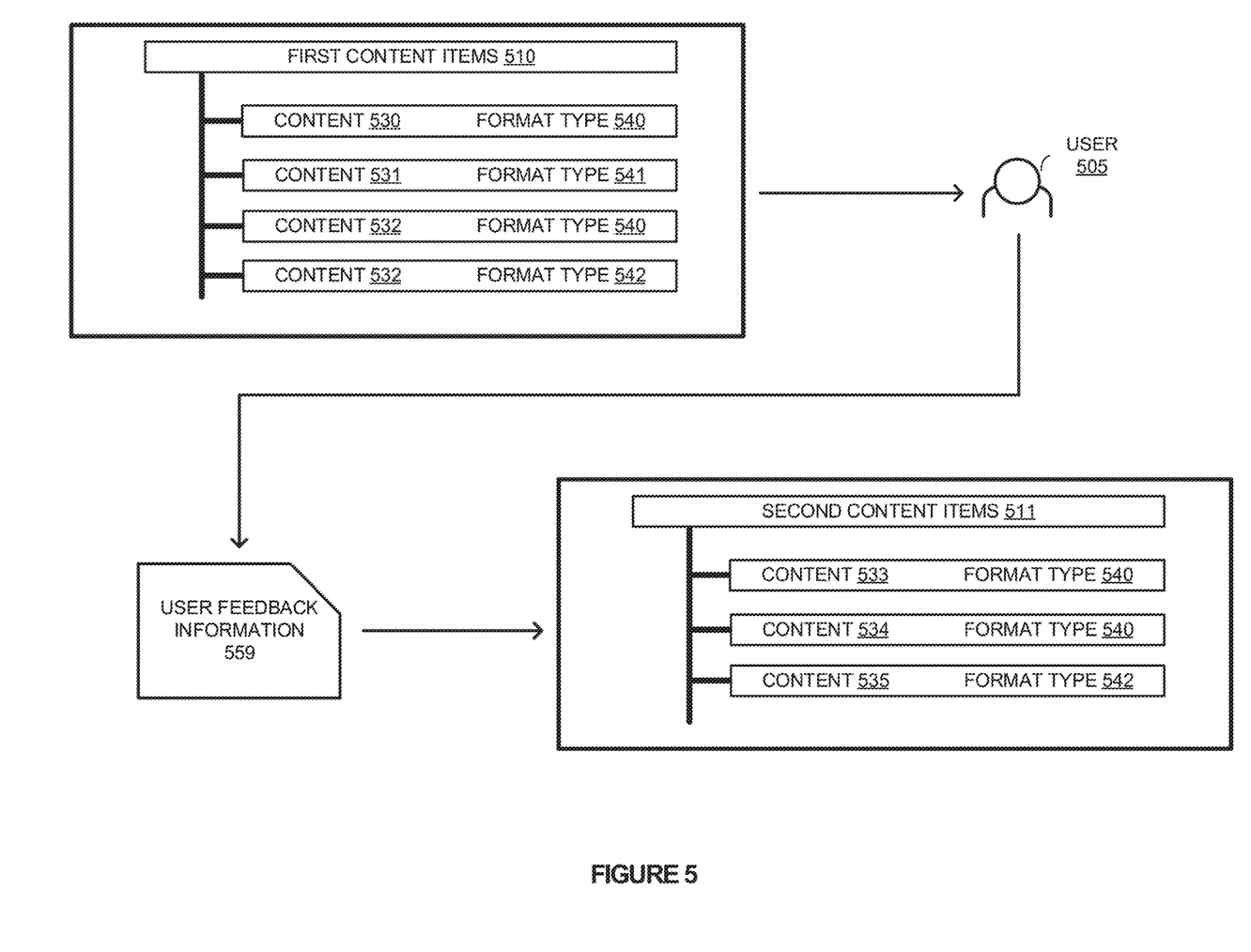
FIG. 5 illustrates an operational scenario of updating content distribution according to an implementation.

FIG. 5 illustrates an operational scenario 500 of updating content distribution according to an implementation. Operational scenario 500 includes first content items 510, second content items 511, user 505, and user feedback information 559.

As described herein, a content service may identify and provide content items to users based on the preferences of the users identified through user interactions in relation to the content items. Here, the content service initially provides first content items 510, wherein each of the content items includes corresponding content 530 that is represented in a format type of format types 540-542. These format types may each include text, images, videos, or some other similar type of media, including combinations thereof. For example, a first format type may provide an image with text overlaid, while a second format type may provide a text summary with a corresponding image. Each content item in content items 510 may include various information regarding a particular topic or topic type. In some examples, two or more of the content items may provide the same information, but in a different format. In other examples, the content items may provide different information related to the same topic type.

After providing first content items 510 to user 505, the content service may then identify user feedback information 559 that corresponds to interactions of the user with various services. These interactions may correspond to interactions with social media services, news services, productivity services, or some other similar service. User feedback information 559 may monitor when user 505 uses data points from a content item of first content items 510, may determine when the user uses language elements associated with a content item of first content items 510, may determine when the user shares or uses an image or video associated with a content item of first content items 510, or may determine any other user interaction that corresponds to a content item of first content items 510. From user feedback information 559, the content service may determine trends that correspond to preferences of user 505. These trends may be identified based on the quantity or frequency that the user generates an interaction related to a particular format type, may be identified based on the proximity of providing the content item to identifying the user interaction related to the content item, or may be identified in any other manner.

Based on the trends from user feedback information 559, the content service may determine format types of interest for user 505, wherein the format types of interest may be maintained in a profile for user 505. This profile may indicate which of the formats are preferred over other formats, the ratio for each of the formats to be provided to user 505, or some other similar information corresponding to the preferences of the user. As the profile is updated, the content service may identify second content items 511 to be provided to user 505 based on the profile. Here, based on user feedback information 559, the content service determines that format type 540 is of interest to the user and identifies two content items of second content items 511 to be provided in accordance with format type 540. Additionally, the content service provides a content item with content 535 that is provided in accordance with format type 542. Format type 542 may be selected based on user feedback information, may be randomly selected by the content service, or may be selected in any other similar manner. As an example, the content service may maintain a data structure that indicates ratios for each of the format types to be provided to user 505, wherein format type 540 may comprise a larger ratio than format type 542. In another example, content service may select format type 542 randomly from a set of format types. This random selection of the alternative format may be used to provide additional feedback to the content service to determine if format type 540 remains the most pertinent for user 505.

In some implementations, the profile for a user may be specific to different topic types. These topic types may include advertisement types, news story types, or some other similar topic type, including subsets therein. Using different topic types, a profile for a user may provide content items associated with advertising using a first format type, while content items associated with news stories may be provided using a second content format.

Although demonstrated as supporting a profile for a single user, it should be understood that the operations may be expanded to groups of users. In at least one implementation, the content service may identify and provide first content items to a group of users and monitor the interactions of the group of users to identify content formats of interest to the group. This monitoring may include monitoring posts to one or more services, including social media services, news services, or some other similar types of services. In at least one example, the first content items may be presented as part of a social media service and the social media service may be monitored to determine which of the content formats are of interest to the group of users. This may include determining which of the formats where shared, whether any images, videos, etc. were shared, whether language patterns were used from specific formats, whether data points were present from specific formats, or some other similar trend monitoring operation.

Figure 6:
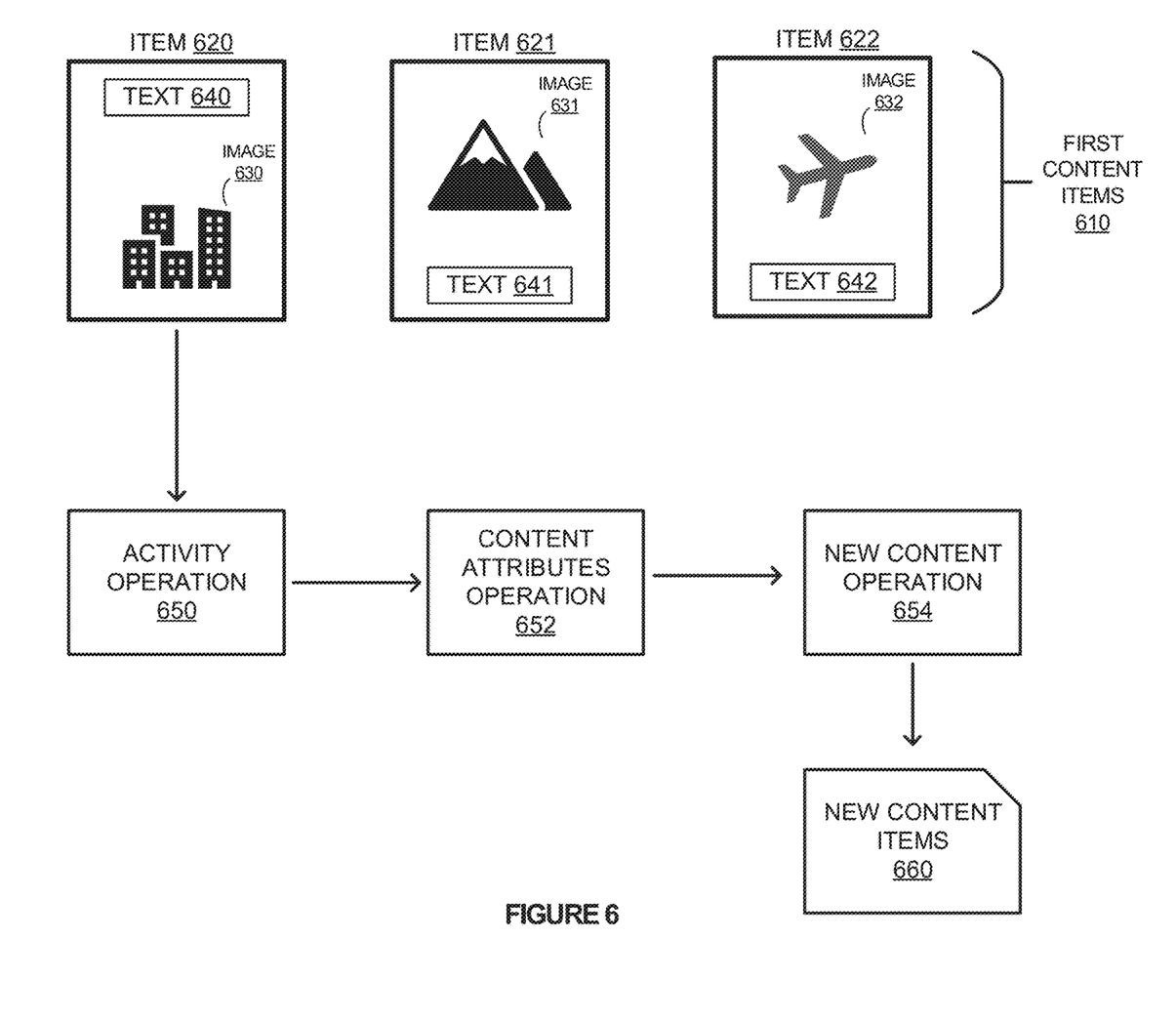
FIG. 6 illustrates an operation to update a content distribution profile according to an implementation.

FIG. 6 illustrates an operation to update a content distribution profile according to an implementation. The operation of FIG. 6 includes first content items 610 with content items 620-622 (each with a different arrangement of content), activity operation 650, content attributes operation 652, new content operation 654, and new content items 660. Operations 650, 652, and 654 may be implemented by a content service, such as content service 160 of FIG. 1, although other examples may exist. Content items 620-622 include corresponding images 630-632 and text 640-642. Although demonstrated with text and images, it should be understood that content items may include videos, sound files, or some other similar media, including combinations thereof.

As described herein, a content service may determine content items to be provided to one or more end users, wherein the content items may feature various formats. These formats may comprise different combinations of text, video, images, or some other similar content to provide information about a topic to an end user, and may further comprise different arrangements of the content for the content items. For example, content item 620 is provided that includes text 640 that provides information along with image 630 for a particular topic. After first content items 610 are provided to the one or more users, activity operation 650 may monitor user interactions with one or more services or applications to determine whether any of the interactions are relate to first content items 610. In determining whether the interactions are related to first content, activity operation 650 may monitor for language used in the content items, images, videos, or other media from the content items, data points provided in the content items, or some other similar information from the content items. When an interaction is identified that corresponds to a first content item that was provided to the one or more users, content attributes operation 652 may determine which content formats are of interest to the user.

Here, content item 620 may correspond to a first content format, wherein text is provided above an image corresponding to the topic, while content items 621-622 may correspond to a second content format, wherein text is provided below an image corresponding to the topic. Once the content items are provided, the content service may determine that a user generated an interaction that corresponds to content item 620. As a result, content attributes operation 652 may promote the content format of content items 620 for future content items that are provided to the user. This promotion may include increasing a percentage of content items that correspond to the content format, promoting content items of the first type on a web page or other interface provided to the user, or some other similar promotion. Once content attributes operation 652 determine content formats of interest, new content operation 654 may determine new content items 660 to provide to the user based on the content formats of interest. These content items may be selected based on ratios for each of the content formats or some other similar information in the profile. Once the new content items are selected and provided to the one or more users, the content service may continue monitoring the interactions to the users to provide updates in the content format for the users.

Figure 7:
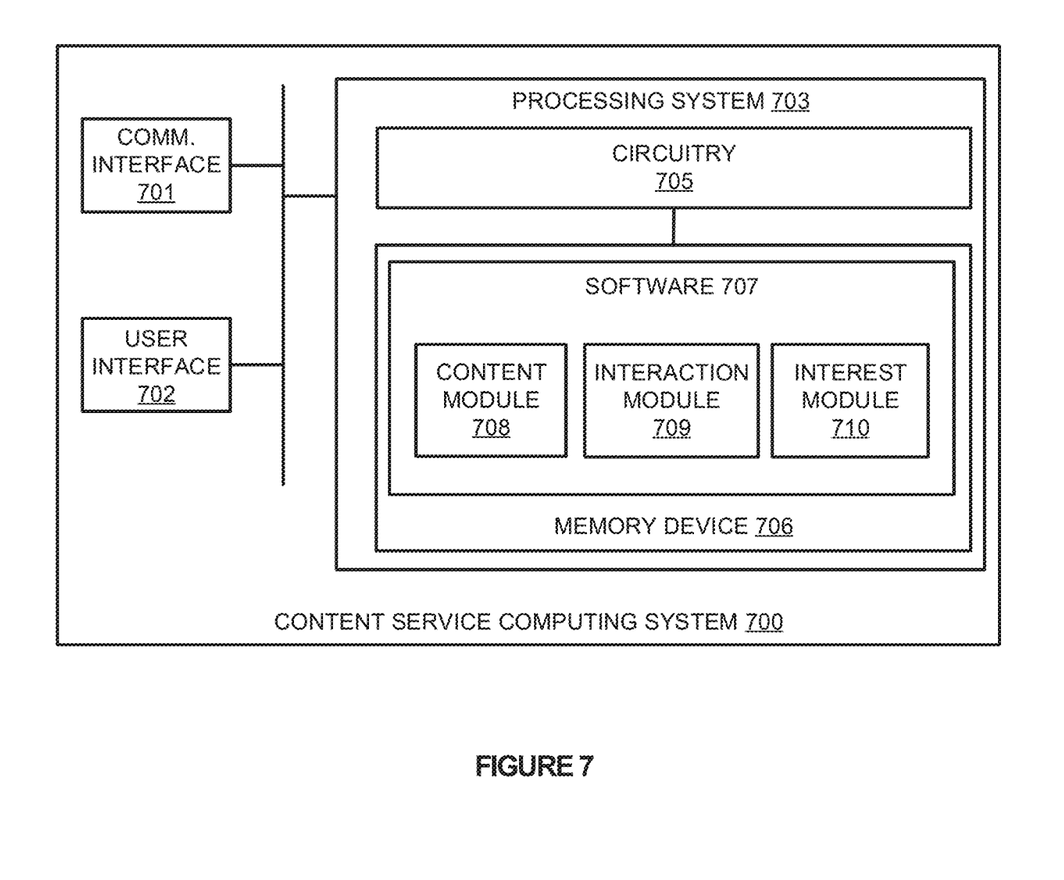
FIG. 7 illustrates a content service computing system according to an implementation.

FIG. 7 illustrates a content service computing system 700 according to an implementation. Computing system 700 is representative of any computing system or systems with which the various operational architectures, processes, scenarios, and sequences disclosed herein for a content service may be implemented. Computing system 700 is an example of content service 160 of FIG. 1, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In some implementations, communication interface 701 may be configured to communicate with client or console devices of end users, wherein the users may request and receive content items from computing system 700. The users may request the content items via a dedicated application on the client device or may request the content items using web browsing application, social media or news application, or some other similar application. In some implementations, communication interface 701 may further communicate with one or more services, such as social networking services, news provider services, or some other similar service to monitor user interactions with various applications and services.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes content module 708, interaction module 709, and interest module 710, although any number of software modules may provide the same operation. Operating software 707 may further include an operating system, utilities, drivers, network interfaces, applications, or some other type of software. When executed by processing circuitry 705, operating software 707 directs processing system 703 to operate computing system 700 as described herein.

In one implementation, content module 708 directs processing system 703 to determine first content to be provided to one or more users. The content may correspond to a particular topic type and may be associated with first content formats. These formats may correspond to how and where media is included in each of the content items, including text, images, videos, or other types of media, the data points included in the content items, or other formatting for the content items. For example, a first content item may be provided with text above an image, while a second content item may be provided with video above descriptive text. Although the first content item and the second content item may provide the same information, the formatting for each of the content items may be different to appeal differently to the one or more users.

After the first content items are provided to the one or more users, interaction module 709 further identifies interactions from the one or more users that correspond to the first content items. These interactions may be identified based on the natural language used in the interaction, any data points (facts, opinions, and the like) that were used in the interaction, any videos or images used in the interaction, or some other means of associating an interaction of a user with the first content items. Once an interaction is associated with the first content items, interest module 710 may determine which content formats are of interest to the one or more users based on the source content format for the interaction. For example, if a user shared an image that was provided in the first content items, interest module 710 may determine which content format or formats shared images as part of the content format. Once identified, the content formats associated with the interactions of the one or more users may be promoted over other content formats. This may include increasing the percentage of content associated with the content formats of interest, removing content formats for the one or more users that are not identified as interest to the one or more users, or providing some other operation to promote the content formats of interest for the one or more end users. After the content formats of interest are updated, content module 708 may provide secondary content items to the one or more users based on the content formats of interest for the one or more end users.

Returning to the elements of FIG. 1, secondary services 140 may comprise websites and/or databases capable of providing news stories, social media posts, blog posts, images, and other similar types of objects to content service 160 and devices 120-122. Secondary services 140 may each comprise one or more communication interfaces and network interfaces, processing systems, computer systems, microprocessors, storage systems, storage media, or some other processing devices or software systems. Secondary services 140 may each comprise one or more serving computing systems, desktop computing systems, or some other similar computing system.

Content service 160 comprise communication interfaces and network interfaces, processing systems, computer systems, microprocessors, storage systems, storage media, or some other processing devices or software systems, and can be distributed among multiple devices. Content service 160 may include software such as an operating system, logs, databases, utilities, drivers, networking software, and other software stored on a computer-readable medium.

End user devices 120-122 may each comprise smartphones, smart speakers, computers, tablets, or some other similar computing device. End user devices 120-122 may each comprise communication interfaces and network interfaces, processing systems, computer systems, microprocessors, storage systems, storage media, or some other processing devices or software systems.

Communication between content service 160, secondary services 140, and devices 120-122 is facilitated by network 150. Communication between the between content service 160, secondary services 140, and devices 120-122 may use metal, glass, optical, air, space, or some other material as the transport media. Communication between content service 160, secondary services 140, and devices 120-122 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communications between content service 160, secondary services 140, and devices 120-122 may be a direct link or can include intermediate networks, systems, or devices, and can include a logical network link transported over multiple physical links.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   determining first content items in first content formats for at least one end user, wherein the first content formats each comprise a different text structure, and wherein different text structures comprise different word choice or organization of text;
   monitoring user interactions for the at least one end user with one or more services after the first content is provided to the at least one end user, wherein monitoring the user interactions for the at least one user with the one or more services comprises monitoring text content generated by the at least one user;
   determining content formats of interest for the at least one end user based on the user interactions in comparison to the first content formats, wherein determining the content formats of interest comprises:
      comparing the text content generated by the at least one user with the different text structures of the first content formats; and
      determining the content formats of interest based on the compared text content generated by the at least one end user and the different text structures; and
   determining second content items in second content formats for the at least one end user based on the content formats of interest.

2. The method of claim 1, wherein the first content formats each comprise a different arrangement of text, one or more images, one or more videos, or one or more graphs.

3. The method of claim 1, wherein the first content items each provide the same one or more data points.

4. The method of claim 1, wherein the one or more services comprise social media services, blog services, or messaging services.

5. The method of claim 1,
   wherein the first content formats comprise different images;
   wherein monitoring the user interactions for the at least one end user with the one or more services further comprises monitoring images used in posts by the at least one end user with the one or more services; and
   wherein determining the content formats of interest for the at least one end user based on the user interactions in comparison to the first content formats further comprises:
      comparing the images used in posts by the at least one end user with the images of the first content formats; and
      determining the content formats of interest based on the compared images used in posts by the at least one end user and the images of the first content formats.

6. The method of claim 1, wherein the first content items comprise content items associated with a topic type of a plurality of topic types.

7. The method of claim 6, wherein the plurality of topic types comprises news stories, product advertisements, and political posts.

8. The method of claim 1, wherein the first content formats each comprise an arrangement of one or more images and text.

9. An apparatus comprising:
   one or more non-transitory computer readable storage media;
   a processing system operatively coupled to the one or more non-transitory computer readable storage media; and
   program instructions stored on the one or more non-transitory computer readable storage media that, when executed by the processing system, direct a processing system to:
      determine first content items in first content formats for at least one end user, wherein the first content formats each comprise a different text structure, and wherein different text structures comprise different word choice or organization of text;
      monitor user interactions for the at least one end user with one or more services after the first content is provided to the at least one end user, wherein monitoring the user interactions for the at least one user with the one or more services comprises monitoring text content generated by the at least one user;
      determine content formats of interest for the at least one end user based on the user interactions in comparison to the first content formats, wherein determining the content formats of interest comprises:
         comparing the text content generated by the at least one user with the different text structures of the first content formats; and
         determining the content formats of interest based on the compared text content generated by the at least one end user and the different text structure; and
      determine second content items in second content formats for the at least one end user based on the content formats of interest.

10. The apparatus of claim 9, wherein the first content formats each comprise a different arrangement of text, one or more images, one or more videos, or one or more graphs.

11. The apparatus of claim 9, wherein the first content items each provide the same one or more data points.

12. The apparatus of claim 9, wherein the one or more services comprise social media services, blog services, or messaging services.

13. The apparatus of claim 9,
wherein the first content formats comprise different images;
wherein monitoring the user interactions for the at least one end user with the one or more services further comprises monitoring images used in posts by the at least one end user with the one or more services; and
wherein determining the content formats of interest for the at least one end user based on the user interactions in comparison to the first content formats further comprises:
comparing the images used in posts by the at least one end user with the images of the first content formats; and
determining the content formats of interest based on the compared images used in posts by the at least one end user and the images of the first content formats.

14. The apparatus of claim 9, wherein the first content items comprise content items associated with a topic type of a plurality of topic types.

15. The apparatus of claim 14, wherein the plurality of topic types comprises news stories, product advertisements, and political posts.

16. An apparatus comprising:
one or more non-transitory computer readable storage media;
program instructions stored on the one or more non-transitory computer readable storage media that, when executed by a processing system, direct the processing system to:
determine first content items in first content formats for at least one end user, wherein the first content formats each comprise a different text structure, wherein the different text structures each comprise a different organization of text;
provide, for display, the first content items to at least one device associated with the at least one user;
after providing the first content items, monitor text content generated by the at least one user in association with one or more services;
compare the text content generated by the at least one end user with the different text structures of the first content formats;
determine content formats of interest based on the compared text content generated by the at least one end user and the different text structures of the first content formats; and
determine second content items in second content formats for the at least one end user based on the content formats of interest.

17. The apparatus of claim 16, wherein the first content formats each comprise a different arrangement of text, one or more images, one or more videos, or one or more graphs.

18. The apparatus of claim 16, wherein the first content items each provide the same one or more data points.

19. The apparatus of claim 16, wherein the one or more services comprise social media services, blog services, or messaging services.

20. The apparatus of claim 9, wherein the first content formats each comprise an arrangement of one or more images and text.

* * * * *